US012720311B2

(12) United States Patent
Nadig et al.

(10) Patent No.: US 12,720,311 B2
(45) Date of Patent: Aug. 25, 2026

(54) xApp INSTANCE REGISTRATION IN CLOUD-NATIVE NETWORKS

(71) Applicant: RAKUTEN SYMPHONY, INC., Tokyo (JP)

(72) Inventors: Prithvi Shankar Nadig, Bangalore (IN); Nagendra Shridhar Bykampadi, Bangalore (IN); Krishna Pramod Adharapurapu, Bangalore (IN); Paromita Chintan Shah, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 172 days.

(21) Appl. No.: 18/580,829

(22) PCT Filed: Dec. 5, 2023

(86) PCT No.: PCT/US2023/082442

§ 371 (c)(1),
(2) Date: Jan. 19, 2024

(87) PCT Pub. No.: WO2024/258443

PCT Pub. Date: Dec. 19, 2024

(65) Prior Publication Data

US 2025/0227471 A1 Jul. 10, 2025

(30) Foreign Application Priority Data

Jun. 16, 2023 (IN) ............................ 202341041098

(51) Int. Cl.
*H04L 29/06* (2006.01)
*H04W 12/069* (2021.01)

(52) U.S. Cl.
CPC ................................ *H04W 12/069* (2021.01)

(58) Field of Classification Search
CPC ............ H04W 12/069; H04L 63/0823; H04L 9/3263; H04L 9/3268; G06F 21/33
See application file for complete search history.

(56) References Cited

U.S. PATENT DOCUMENTS

2017/0012967 A1* 1/2017 Holloway ........... H04L 63/0823
2023/0353543 A1* 11/2023 Solanki ............... H04L 63/0807

OTHER PUBLICATIONS

Tolga O. Atalay, Sudip Maitra, Dragoslave Stojadinovic, Angelos Stavrou, Haining Wang, "Securing 5G OpenRAN with a Scalable Authorization Framework for xApps", May 17-20, 2023, IEEE INFOCOM 2023—IEEE Conference on Computer Communications, pp. 1-10 (Year: 2023).*

* cited by examiner

*Primary Examiner* — Amir Mehrmanesh
*Assistant Examiner* — Chi D Nguy
(74) *Attorney, Agent, or Firm* — Sughrue Mion, PLLC

(57) ABSTRACT

Provided are a method, system, and device for registering an xApp instance in a cloud-native network. The method may be implemented by a Near Real-Time (RT) Radio Access Network (RAN) Intelligent Controller (RIC), and the method may include: receiving a registration message including details of an xApp instance and an xApp identifier (ID) from Service Management and Orchestration (SMO); generating a certificate signing request (CSR) based on the registration message, wherein the CSR includes the xApp ID registered in the Near RT-RIC; receiving an identification request message from the xApp instance; verifying the xApp instance based on the identification request message; and sending an identification response message to the xApp instance.

20 Claims, 18 Drawing Sheets

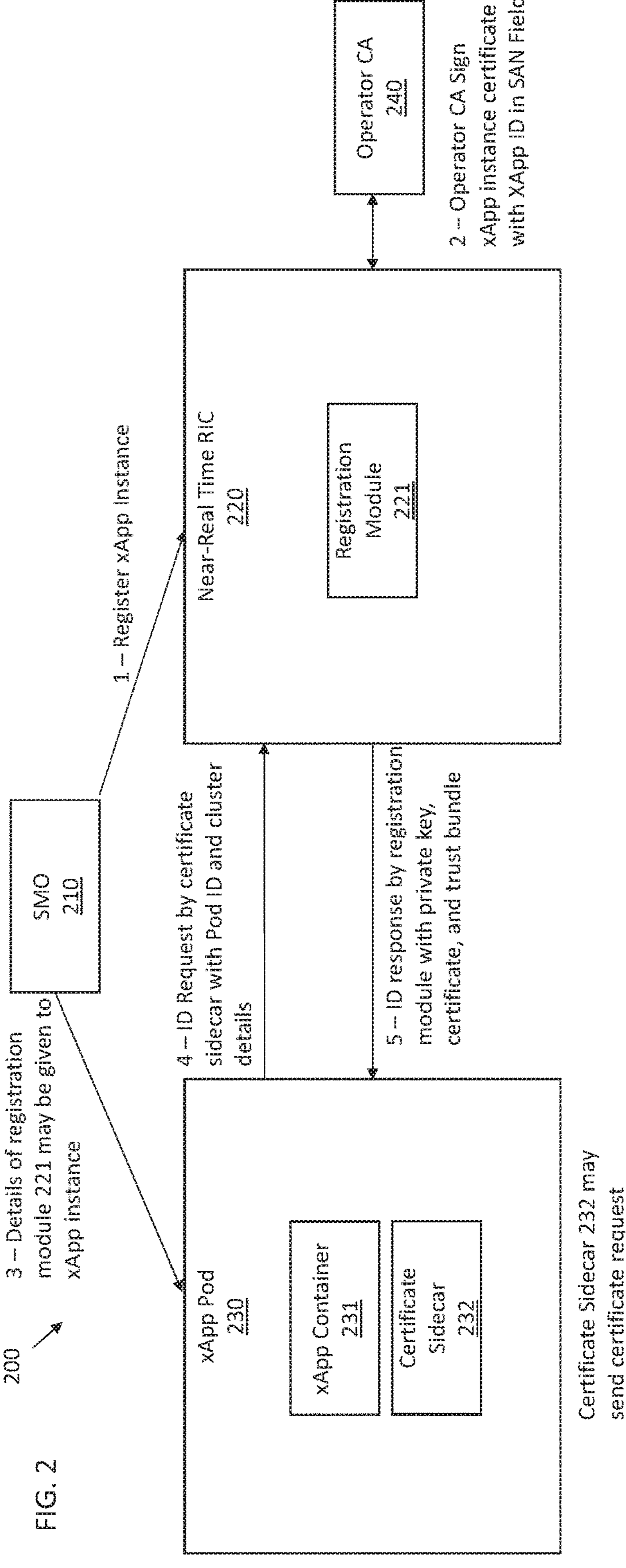
FIG. 2
200
3 – Details of registration module 221 may be given to xApp instance
SMO
210
1 – Register xApp Instance
xApp Pod
230
xApp Container
231
Certificate Sidecar
232
4 – ID Request by certificate sidecar with Pod ID and cluster details
5 – ID response by registration module with private key, certificate, and trust bundle
Near-Real Time RIC
220
Registration Module
221
Operator CA
240
2 – Operator CA Sign xApp instance certificate with XApp ID in SAN Field
Certificate Sidecar 232 may send certificate request

FIG. 3A

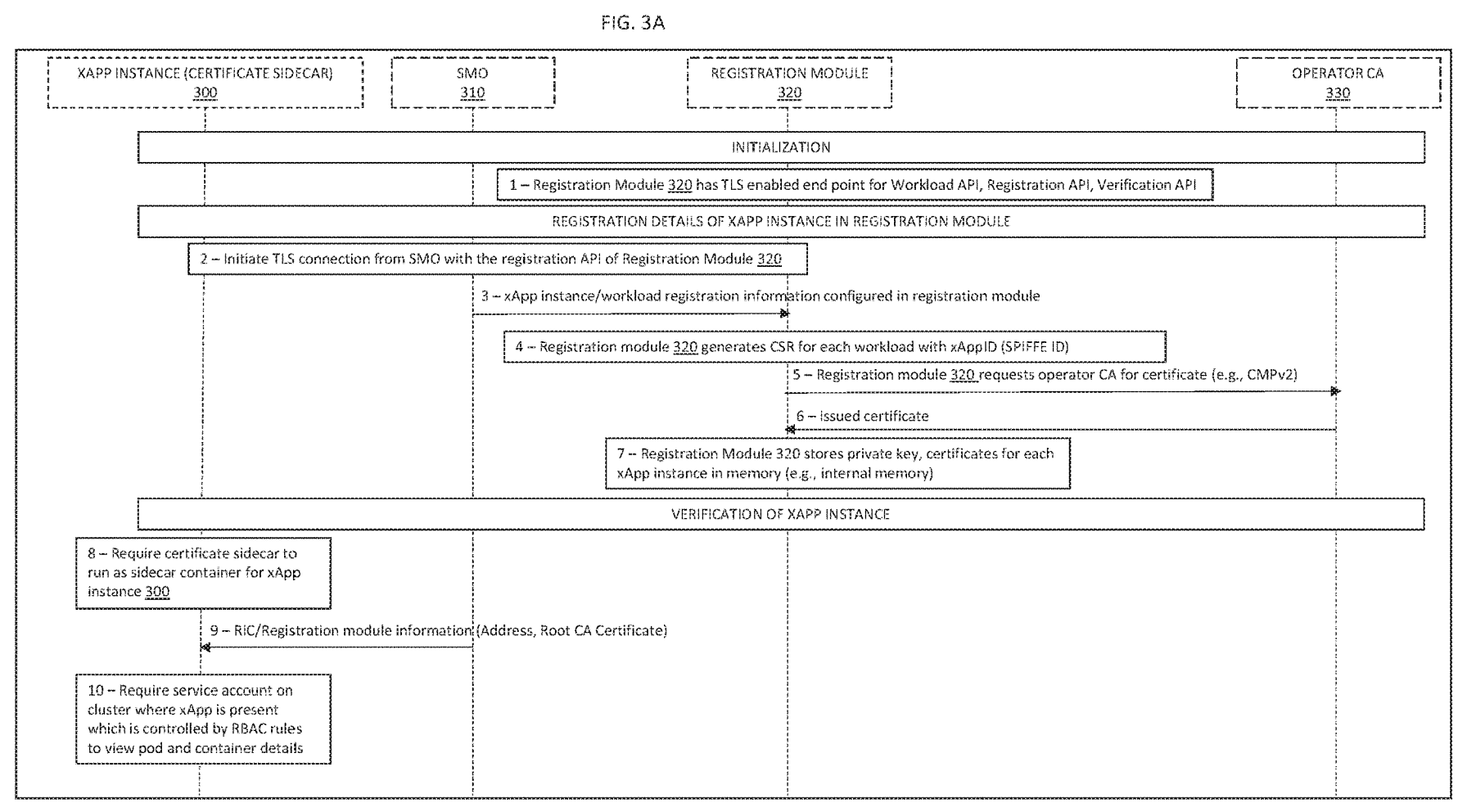

XAPP INSTANCE (CERTIFICATE SIDECAR) 300

SMO 310

REGISTRATION MODULE 320

OPERATOR CA 330

INITIALIZATION

1 – Registration Module 320 has TLS enabled end point for Workload API, Registration API, Verification API

REGISTRATION DETAILS OF XAPP INSTANCE IN REGISTRATION MODULE

2 – Initiate TLS connection from SMO with the registration API of Registration Module 320

3 – xApp instance/workload registration information configured in registration module 4 – Registration module 320 generates CSR for each workload with xAppID (SPIFFE ID)

5 – Registration module 320 requests operator CA for certificate (e.g., CMPv2)

6 – issued certificate

7 – Registration Module 320 stores private key, certificates for each xApp instance in memory (e.g., internal memory)

VERIFICATION OF XAPP INSTANCE

8 – Require certificate sidecar to run as sidecar container for xApp instance 300

9 – RIC/Registration module information (Address, Root CA Certificate)

10 – Require service account on cluster where xApp is present which is controlled by RBAC rules to view pod and container details

FIG. 3B

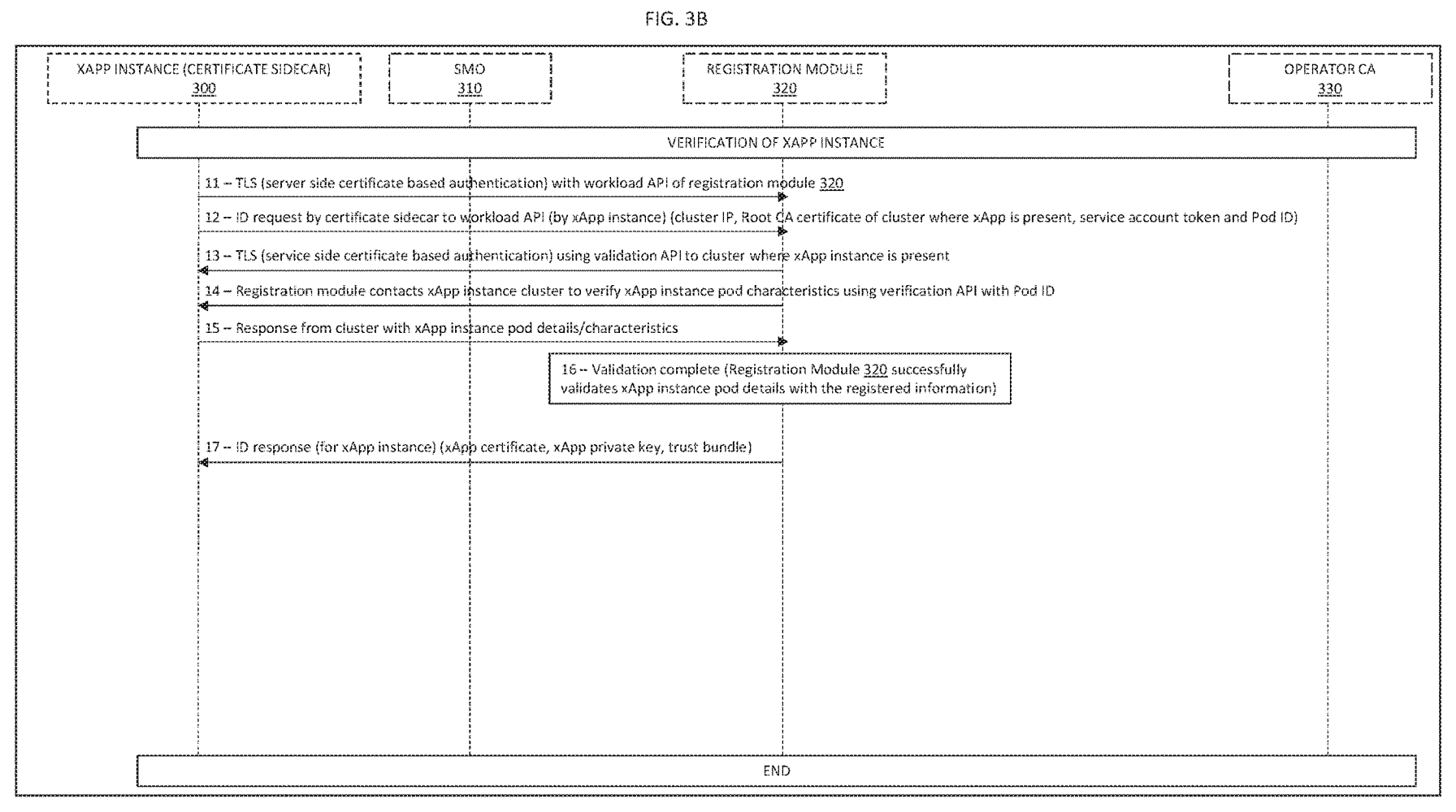

XAPP INSTANCE (CERTIFICATE SIDECAR) 300

SMO 310

REGISTRATION MODULE 320

OPERATOR CA 330

VERIFICATION OF XAPP INSTANCE

11 -- TLS (server side certificate based authentication) with workload API of registration module 320

12 -- ID request by certificate sidecar to workload API (by xApp instance) (cluster IP, Root CA certificate of cluster where xApp is present, service account token and Pod ID)

13 -- TLS (service side certificate based authentication) using validation API to cluster where xApp instance is present 14 -- Registration module contacts xApp instance cluster to verify xApp instance pod characteristics using verification API with Pod ID 15 -- Response from cluster with xApp instance pod details/characteristics 16 -- Validation complete (Registration Module 320 successfully validates xApp instance pod details with the registered information)

17 -- ID response (for xApp instance) (xApp certificate, xApp private key, trust bundle)

END

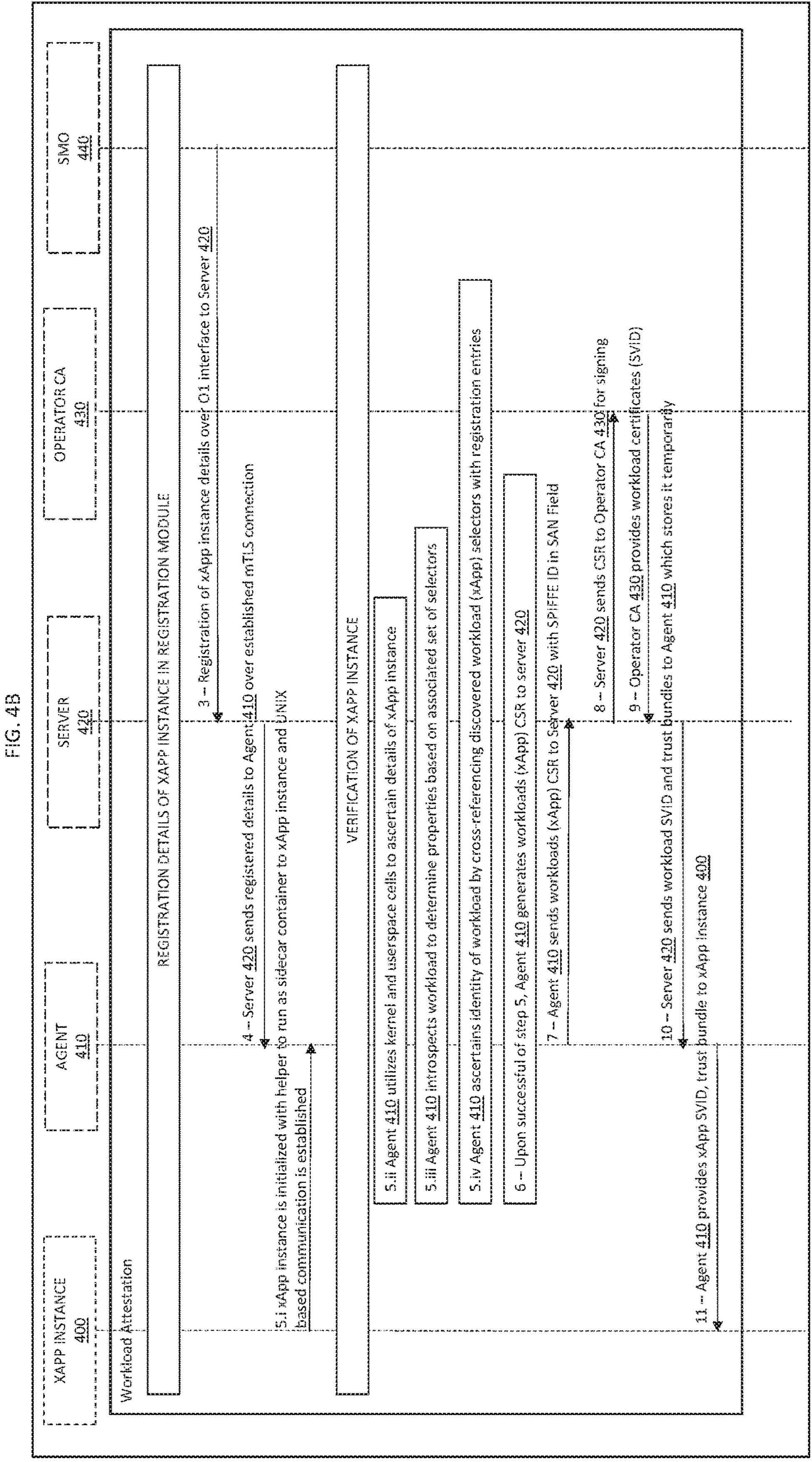
FIG. 4B
XAPP INSTANCE 400
AGENT 410
SERVER 420
OPERATOR CA 430
SMO 440
Workload Attestation
REGISTRATION DETAILS OF XAPP INSTANCE IN REGISTRATION MODULE
3 -- Registration of xApp instance details over O1 interface to Server 420
4 -- Server 420 sends registered details to Agent 410 over established mTLS connection
5.i xApp instance is initialized with helper to run as sidecar container to xApp instance and UNIX based communication is established
VERIFICATION OF XAPP INSTANCE
5.ii Agent 410 utilizes kernel and userspace cells to ascertain details of xApp instance
5.iii Agent 410 introspects workload to determine properties based on associated set of selectors
5.iv Agent 410 ascertains identity of workload by cross-referencing discovered workload (xApp) selectors with registration entries
6 -- Upon successful of step 5, Agent 410 generates workloads (xApp) CSR to server 420
7 -- Agent 410 sends workloads (xApp) CSR to Server 420 with SPIFFE ID in SAN Field
8 -- Server 420 sends CSR to Operator CA 430 for signing
9 -- Operator CA 430 provides workload certificates (SVID)
10 -- Server 420 sends workload SVID and trust bundles to Agent 410 which stores it temporarily
11 -- Agent 410 provides xApp SVID, trust bundle to xApp instance 400 xApp INSTANCE REGISTRATION IN CLOUD-NATIVE NETWORKS

CROSS-REFERENCE TO RELATED APPLICATION(S)

This application is a National Stage of International Application No. PCT/US2023/082442 filed Dec. 5, 2023, claiming priority based on Indian Provisional Patent Application No. 202341041098 filed on Jun. 16, 2023, the disclosure of which is incorporated by reference herein in its entirety.

TECHNICAL FIELD

System and methods consistent with example embodiments of the present disclosure relate to xApp instance registration in Cloud-Native networks, such as an Open Radio Access Network (O-RAN).

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical Node for hosting Radio Resource Control (RRC), Service Data Adaptation Protocol (SDAP), and/or Packet Data Convergence Protocol (PDCP) sublayers of the RAN. The DU is a logical Node hosting Radio Link Control (RLC), Media Access Control (MAC), and Physical (PHY) sublayers of the RAN. The RU is a physical Node that converts radio signals from antennas to digital signals that can be transmitted over the Fronthaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a RAN Intelligent Controller (RIC). The RIC is a software-defined component that implements modular applications to facilitate the multivendor operability required in the O-RAN system, as well as to automate and optimize RAN operations. The RIC is divided into two types: a non-real-time RIC (Non-RT RIC) and a near-real-time RIC (Near-RT RIC).

The Non-RT RIC is the control point of a non-real-time control loop and operates on a timescale greater than 1 second within the Service Management and Orchestration (SMO) framework. Its functionalities are implemented through modular applications called rApps (rApp 1, . . . , rApp N), and include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., Near-RT RIC, O-RAN Centralized Unit (O-CU), O-RAN Distributed Unit (O-DU), etc.).

The Near-RT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The Near-RT RIC uses the E2 interface to control the underlying RAN elements (E2 Nodes/network functions (NFs)) over a near-real-time control loop. The Near-RT RIC monitors, suspends/stops, overrides, and controls the E2 Nodes (O-CU, O-DU, and O-eNB) via policies. For example, the Near-RT RIC sets policy parameters on activated functions of the E2 Nodes. Further, the Near-RT RIC hosts xApps to implement functions such as quality of service (QoS) optimization, mobility optimization, slicing optimization, interference mitigation, load balancing, security, etc. The two types of RICs work together to optimize the O-RAN. For example, the Non-RT RIC provides, over the A1 interface, the policies, data, and AI/ML models enforced and used by the Near-RT RIC for RAN optimization, and the Near-RT RIC returns policy feedback (i.e., how the policy set by the NON-RT RIC works).

The SMO framework, within which the Non-RT RIC is located, manages and orchestrates RAN elements. Specifically, the SMO includes the Federated O-Cloud Orchestration and Management (FOCOM), a Network Function Orchestrator (NFO) that manages Virtual Machines (VM) based Virtual Network Functions (VNF) or Cloud-Native Network Functions (CNF) and container (i.e., instance) based VNF (CNF), and the operation and maintenance (OAM) as a part of the SMO that manages and orchestrates what is referred to as the O-RAN Cloud (O-Cloud). The O-Cloud is a collection of physical RAN Nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides Infrastructure Management Services (IMS) and Deployment Management Services (DMS). The O2 interface may also send O2 telemetry data to the SMO, e.g., O-Cloud configuration or any logical function data, energy consumption, health status of Node, etc.

In the related art, an xApp (eXtended Application) instance is a software application that is deployed over the Near-RT RIC. xApps may typically include one or more cloud-native microservice(s). An xApp instance may register to the Near-RT RIC using an xApp identifier (ID). The xApp solution provider typically may digitally sign the xApp and provide it to an operator, and the operator in turn may validate the digital signature and add its own signature to the package.

xApps may communicate with other entities in the O-RAN network using a unique identifier. The unique ID of an xApp instance is a digital certificate signed by an operator and used for authenticating itself in the network. The xApp registration procedure may require that the xApp instance sends an authentication token (such as OAuth) along with the certificate signing request (CSR) towards the Near-RT RIC for generating digital certificates with the xApp ID. The proof of possession of the private key is the method which may be used to verify the authenticity of the xApp in the RIC.

SUMMARY

In the related art, in order to communicate with other entities in an O-RAN network, an xApp instance may generate and send a CSR to the Near-RT RIC and the RIC may in turn embed the xApp ID through a policy and send the CSR to the operator for signing. The operator may then send the certificate to the xApp instance, thereby embedding the xApp ID in the Subject Alt Name (SAN) field of the certificate.

However, this approach may have security risks by increasing the attack surface for the xApp instance, as the xApp is accordingly responsible for managing its own private key and certificate management. Furthermore, in the related art, the xApp ID is typically in UUID format and UUIDs are random in nature. There is a lack of a standardized format for xApp IDs.

Accordingly, there is a need for a more secure method for registering an xApp instance, including generating and handling xApp IDs which are independent of the xApp itself.

Example embodiments of the present disclosure provide a method and system for registering an xApp instance in a cloud-native network such as O-RAN. Particularly, the method may be implemented by a Near Real-Time (RT) Radio Access Network (RAN) Intelligent Controller (RIC), and the method may include: receiving a registration message including details of an xApp instance and an xApp identifier (ID) from Service Management and Orchestration (SMO); generating a certificate signing request (CSR) based on the registration message, wherein the CSR includes the xApp ID registered in the Near RT-RIC; receiving an identification request message from the xApp instance; verifying the xApp instance based on the identification request message; and sending an identification response message to the xApp. Accordingly, since the registration module can handle the private key and certificate management for the xApp, the overall attack surface is reduced since the private key is not exposed. In addition, since the xApp instance itself does not generate the CSR, the xApp instances has reduced burden (e.g., private key and certificates are stored in the registration module's memory, and do not require external secure storage) and the xApp does not need to be aware of any underlying security management procedure(s). Accordingly, a more secure and efficient way of registering xApp instances may be achieved.

According to embodiments, a method implemented by a Near Real-Time (RT) Radio Access Network (RAN) Intelligent Controller (RIC), the method including: receiving, by a server, a certificate signing request (CSR) for an xApp instance originating from an agent, wherein the CSR includes an xApp identifier (ID); sending, by the server, the CSR to an operator certificate authority (CA) for signing; receiving, by the server, an xApp Secure Production Identity Framework for Everyone (SPIFFE) verifiable identity document (SVID) from the operator CA; and sending, by the server, the xApp SVID to the agent, wherein upon receiving the xApp SVID, the agent provides the xApp SVID and a trust bundle to the xApp instance.

According to embodiments, a Near Real-Time (RT) Radio Access Network (RAN) Intelligent Controller (RIC) may be provided and configured to: receive a registration message including details of an xApp instance and an xApp identifier (ID) from Service Management and Orchestration (SMO); generate a certificate signing request (CSR) based on the registration message, wherein the CSR includes the xApp ID registered in the Near RT-RIC; receive an identification request message from the xApp instance; verify the xApp instance based on the identification request message; and send an identification response message to the xApp instance.

According to embodiments, a Near Real-Time (RT) Radio Access Network (RAN) Intelligent Controller (RIC) may be provided and configured to: receive a certificate signing request (CSR) for an xApp instance originating from an agent, wherein the CSR includes an xApp identifier (ID); send the CSR to an operator certificate authority (CA) for signing; receive an xApp Secure Production Identity Framework for Everyone (SPIFFE) verifiable identity document (SVID) from the operator CA; and send the xApp SVID to the agent, wherein upon receiving the xApp SVID, the agent provides the xApp SVID and a trust bundle to the xApp instance.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 2 illustrates an example system architecture diagram for an xApp instance registration interface according to an embodiment;

FIG. 3A-3B illustrates an example callflow diagram for xApp instance registration using a certificate sidecar according to an embodiment;

FIG. 4A-4C illustrates an example callflow diagram for xApp instance registration using an agent and server according to an embodiment;

DETAILED DESCRIPTION

Figure 1:
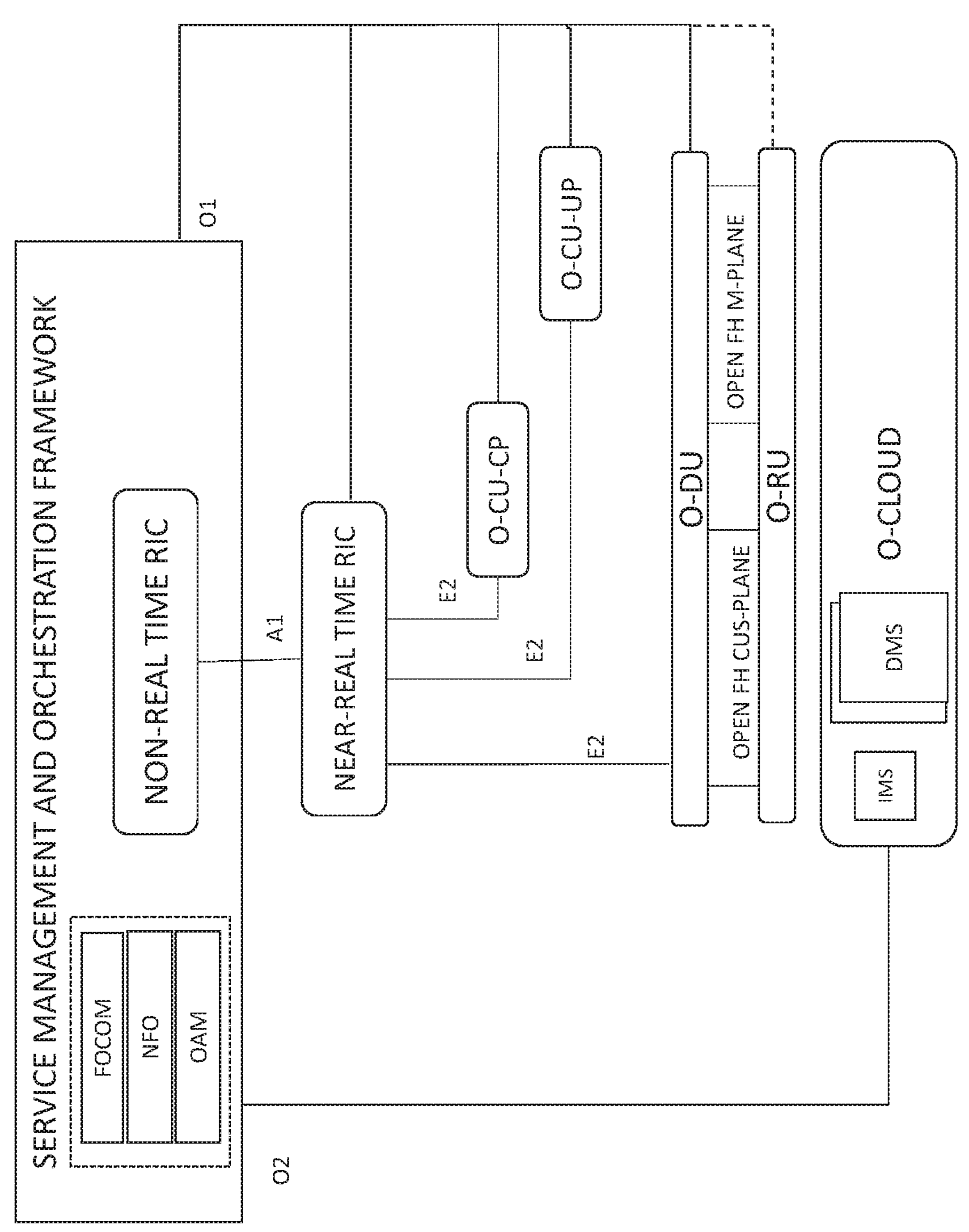
FIG. 1 illustrates an O-RAN architecture according to the related art.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system for registering an xApp instance in a cloud-native network such as O-RAN. Particularly, the method may be implemented by a Near Real-Time (RT) Radio Access Network (RAN) Intelligent Controller (RIC), and the method may include: receiving a registration message including details of an xApp instance and an xApp identifier (ID) from Service Management and Orchestration (SMO); generating a certificate signing request (CSR) based on the registration message, wherein the CSR includes the xApp ID registered in the Near RT-RIC; receiving an identification request message from the xApp instance; verifying the xApp instance based on the identification request message; and sending an identification response message to the xApp. Accordingly, since the registration module can handle the private key and certificate management for the xApp, the overall attack surface is reduced since the private key is not exposed. In addition, since the xApp instance itself does not generate the CSR, the xApp instances has reduced burden (e.g., private key and certificates are stored in the registration module's memory, and do not require external secure storage) and the xApp does not need to be aware of any underlying security management procedure(s). Accordingly, a more secure and efficient way of registering xApp instances may be achieved.

FIG. 2 illustrates an example system architecture diagram for an xApp instance registration interface 200 according to an embodiment. xApp instances may have a standardized identifying format such as using Secure Production Identity Framework for Everyone (SPIFFE). xApp instances may be identified using pod/containers in the cloud network. A SPIFFE module (which may also be referred to as a "registration module" herein) and SPIFFE helper module (which may also be referred to as a "helper module" herein) may be provided in some embodiments.

According to embodiments, a certificate sidecar may be used as an alternative/improvement to the helper module for SPIFFE. The certificate sidecar may be a lightweight container that runs parallel to the xApp container, and may help with providing the pod and cluster identity to the registration module (SPIFFE module).

Referring to FIG. 2, SMO 210, Near-Real Time RIC 220, and xApp Pod 230 may be provided.

Registration module 221 operates within Near-Real Time RIC 220, and may be a SPIFFE module according to embodiments. Registration module 221 may issue certificates, such as but not limited to X.509 certificates to xApp instances during the initial registration procedure. The registration module 221 may be configured to interact with the operator Certificate Authority (CA) 240. Registration module 221 may first be instantiated on the Near-Real Time RIC 220 (e.g., at an initialization phase).

The xApp Pod 230 (in which an xApp instance operates) contains the xApp container 231 and certificate sidecar 232. Certificate sidecar 232 may operate in parallel with xApp container 231 within xApp Pod 230. Certificate sidecar 232 may provide support to the registration module 221 by providing the xApp instance and cluster details to registration module 221.

At operation 1 (as illustrated in FIG. 2), the SMO 210 may register the details of the xApp Instance in registration module 221.

At operation 2 (as illustrated in FIG. 2), the registration module 221 may interact with the operator CA 240 to generate certificates (such as X.509 certificates) for the xApp instance. Operations 1 and 2 in combination may be considered as the registration phase, that is, registration of the xApp instance.

At operation 3 (as illustrated in FIG. 2), the SMO 210 may provide the details of the xApp module to the xApp instance (xApp Pod 230).

At operation 4 (as illustrated in FIG. 2), certificate sidecar 232 may send an ID request with Pod ID and cluster details to registration module 221. Accordingly, registration module 221 may be able to obtain the run-time details of xApp instances and compare them with the registered information (of the xApp instance).

At operation 5 (as illustrated in FIG. 2), upon successful verification (based on the ID request sent in operation 4), the registration module 221 may provide the certificate, private key, and trust bundle to the xApp instance. Operations 4 and 5 in combination may be considered as the verification phase.

FIGS. 3A-3B illustrates an example callflow diagram for xApp instance registration using a certificate sidecar according to an embodiment. xApp instance (certificate sidecar) 300, SMO 310, registration module 320, and operator CA 330 may be provided, and may be similar to xApp Pod 230, SMO 210, registration module 221, and operator CA 240, respectively, described above with reference to FIG. 2.

Operations in FIGS. 3A-3B may be categorized into operations for initialization, registration, and verification as follows.

Initialization:

Referring to FIG. 3A, in operation 1, registration module 320 (which may be a SPIFFE Module) is installed onto the cloud-native (i.e., O-RAN) architecture. The workload API, registration API and verification API may be exposed in a secure mode using transport layer security (TLS).

Registration:

As a pre-requisite for the registration operations, the details of xApp instances and registration module ID (SPIFFE ID) could be present in the SMO 310. Details of xApp instance can include, but are not necessarily limited to, pod information such as pod labels, image name, image digest, etc.

At operation 2, SMO 310 may establish a secure connection with the registration API of the registration module 320 using TLS (server-side certificate authentication).

At operation 3, the SMO 310 may send an instruction to registration module 320 to configure xApp instance/workload registration information in registration module 320. This may be in the form of a registration message which may include xApp instance details and SPIFFE ID. It should be appreciated that registration module 320 operates in the Near-RT RIC.

At operation 4, once registration of the xApp instance is successful, the registration module 320 may generate a CSR on behalf of the xApp (which may include the xApp ID, which identifies the xApp instance).

At operation 5, the registration module 320 may forward the CSR to the operator CA 330 for signing (for example, this may be using CMPv2).

At operation 6, the operator CA 330 generates the certificates with the xApp ID in Subject Alt Name (SAN) and issues it to registration module 320.

At operation 7, the private key, certificate and trust bundle may be stored in registration module 320. This may be, for example, using internal memory.

Verification:

At operation 8, it may be required that a certificate sidecar operates as a sidecar container for xApp instance 300. This may be, for example, certificate sidecar 232 with reference to FIG. 2 above.

At operation 9, SMO 310 may provide the xApp instances information about the registration module 320 (IP address, root certificate, etc.).

As a pre-requisite to the xApp instance verification operations, it may be required that a service token be generated on the cluster where the xApp instance is present. At operation 10, it may be required that there is a service account on the cluster, according to embodiments. The scope of the service account in this example may be limited to only viewing of pods and container details using Role-Based Access Control (RBAC) rules.

Referring now to FIG. 3B, at operation 11, the certificate sidecar of xApp instance 300 may initiate a secure connection to a workload API of registration module 320 (server-side authentication using certificate). This may be using TLS according to embodiments.

At operation 12, the certificate sidecar of xApp instance 300 may send its pod ID in the ID request message to the registration module 320 and also send cluster IP, the root certificate of the cluster on which the xApp instance is present and service account token which was created as a prerequisite in verification operation 10.

At operation 13, the registration module 320 may initiate secure connection towards cluster of xApp instance 300 using a verification API.

At operations 14, the registration module 320 may contact/query cluster of xApp instance 300 to verify pod characteristics using a verification API. This may be performed based on the service account token and pod ID of xApp instance 300 received in the ID request message in verification operation 11.

At operation 15, the registration module 320 may receive a response from cluster of xApp instance 300 based on the contact/query sent in operation 14.

At operation 16, if the details of xApp instance match with the registered information (e.g., as registered in operation 4), validation may be completed by registration module 320. Accordingly, at operation 17, the registration module 320 may send the private key, X.509 certificate with xApp ID (which may be in the format of SVID (SPIFFE verifiable identity document)) and trust bundle in the ID response message using the workload API to the certificate sidecar of xApp instance 300.

The xApp instance 300 may be identified by the xApp ID present in the SAN field of the X.509 certificate. The validation criteria to identify the xApp instance may have many options, which include, but are not necessarily limited to, pod labels, pod name, image name, image ID, container name, pod labels, etc. It should be appreciated that the validation criteria for identifying the xApp instance is left to the operator depending on the specific implementation and is not limited thereto.

xApp Secure Connection to Near-RT RIC:

According to embodiments, the xApp instance 300 may establish a TLS connection to the Near-RT RIC platform, using the SVID obtained in operation 17. Near-RT RIC can further use the xApp ID in the certificate for identification and further communication with the xApp instance 300. The xApp instance 300 may send a Registration Request toward the Near-RT RIC platform over a secured TLS connection. The Near-RT RIC platform may respond with an xApp registration response message once the xApp ID matches the registration entries.

Figure 4A:
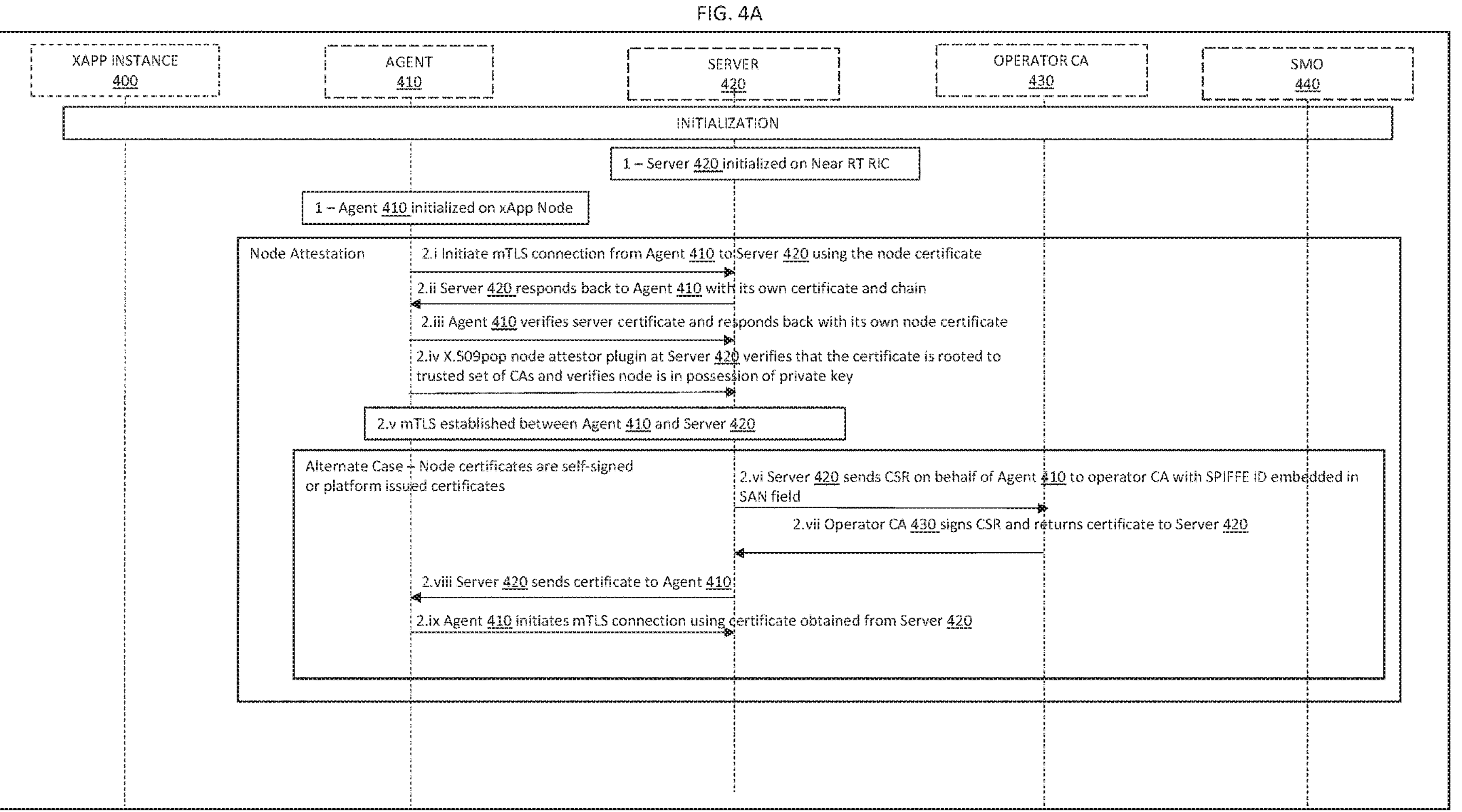
Figure 4C:
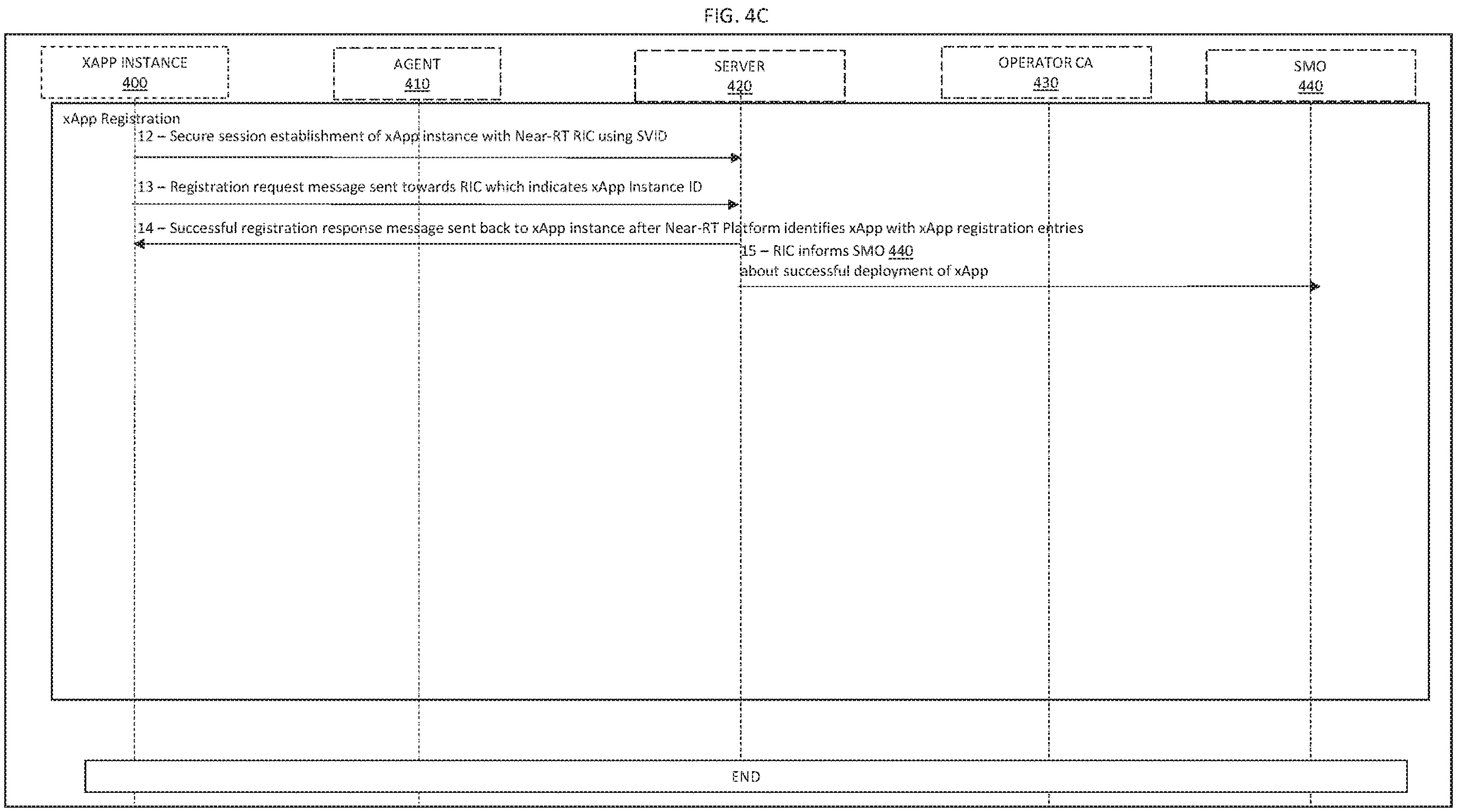

FIGS. 4A-4C illustrates an example callflow diagram for xApp instance registration using an agent and server according to an embodiment. xApp instance 400, agent 410, server 420, operator CA 430, and SMO 440 may be involved. It should be appreciated that xApp instance 400, operator CA 430, and SMO 440 may be similar to those described with reference to FIGS. 2 and 3 above, and accordingly similar descriptions may be omitted for readability.

The example illustrated in FIGS. 4A-4C may be implemented using SPIRE, which is a run-time environment which is a production-ready implementation of SPIFFE APIs which utilizes node and workload attestation in order to securely issue SVID (X.509 certificate with SPIFFE ID) to applications.

Accordingly, the agent 410 may specifically be a SPIRE agent, and server 420 may specifically be a SPIRE server.

Initialization

Referring to FIG. 4A, at operation 1, the server 420 (which may be a SPIRE server) may be initiated on the Near-RT RIC, and agent 410 (which may be a SPIRE agent) may be initiated on an xApp node.

Node Attestation

As a pre-requisite to node attestation, it may be required that a set of trusted CAs are configured on Node-1 and Node-2 for establishing trust during mTLS operation. In addition, Node X.509 certificates may be required to have been provisioned through an out-of-band mechanism. Server 420 may be required to start up and utilize an upstream authority plugin to allow it to integrate with existing public key infrastructure (PKI). Registration APIs may also be required to be initialized for workload registration.

At operation 2.*i*, agent 410 may initiate an mTLS connection to server 420 using the node certificate. At operation 2.*ii*, the server 420 may respond back to agent 410 with its own certificate and chain as part of the TLS handshake.

At operation 2.*iii*, agent 410 verifies the server certificate and responds back with its own node certificate.

At operation 2.*iv*, the X.509pop node attestor plugin at server 420 verifies that the node certificate is rooted to a trusted set of CAs, and issues a signature-based proof-of-possession challenge to the agent plugin to verify that the node is in possession of the private key. Upon verification, at operation 2.*v* mutual TLS (mTLS) connection is established.

It is noted that the node certificate may be expected to have an X.509 certificate signed by the trusted CA in the operator domain in the embodiment illustrated in FIGS. 4A-4C.

As an alternative embodiment to operations 2.*i* through 2.*v*, the node certificates may be self-signed or issued by a cloud network platform (i.e., kubernetes), and server 420 may send the CSR on behalf of agent 410 to operator CA 430 with a SPIFFE ID embedded in the SAN field, and operator CA 430 may accordingly sign the CSR and return the certificate to the server 420. Thereafter, the server 420 may send the certificate to agent 410, and the agent 410 may initiate the mTLS connection using the certificate obtained from server 420 (operations 2.*vi* through operations 2.*ix* as illustrated in FIG. 4A).

Workload Attestation

Referring now to FIG. 4B, at operation 3, the xApp instance details of xApp instance 400 may be registered over an existing O1 interface to server 420 from SMO 440.

At operation 4, the server 420 may send registered details to agent 410 over the established mTLS connection.

At operation 5.*i*, the xApp instance 400 on instantiation is initialized with a helper module to run as a sidecar container to the xApp instance 400 and workload API may be called (e.g., UNIX Domain socket). This is in order to request an SVID from the agent 410 by xApp instance 400. Agent 410 may thereafter be used the perform the workload attestation.

At operation 5.*ii*, agent 410 interrogates the node's kernel and userspace cells to ascertain details of xApp instance 400. That is, agent 410 invokes any configured workload attestor plugins to provide them with the process ID of the workload.

At operation 5.*iii*, agent 410 introspects workload to determine properties based on an associated set of selectors. For instance, when the cloud platform is Kubernetes, a k8s plugin that generates Kubernetes-based selectors (k8 selectors) may be used from workloads calling the agent. This may be performed by retrieving the workload's pod ID from its cgroup membership and querying the kubelet for information about the pod. It should be appreciated that this operation can be performed using other cloud platforms.

At operation 5.*iv*, agent 410 ascertains identity of the workload by cross-referencing discovered workloads selectors with registration entries In operation 6, on successful validation in operation 5, the SPIRE Agent may generate the CSR and private key for each workload (xApp instance 400). The CSRs may have the SPIFFE ID in the SAN field.

In operation 7, agent 410 may send the xApp CSRs to server 420.

In operation 8, server 420 may send the xApp CSRs to operator CA 430 for signing.

In operation 9, operator CA 430 may provide xApp instance SVID back to server 420. Again, it is re-iterated that the SVID are X.509 certificates with SPIFFE ID in the SAN field.

In operation 10, server 420 may send the workload SVID and trust bundles to agent 410. Agent 410 may temporarily store the same.

In operation 11, agent 410 may provide the xApp SVID and trust bundle to xApp instance 400. The xApp instance may use the SVIDs for further communication, like xApp registration towards the Near RT RIC platform.

xApp Registration

Referring now to FIG. 4C, in operation 12, the xApp instance 400 may establish a secure session with the Near-RT RIC using the SVID.

In operation 13, the registration request message may be sent towards the RIC, which includes the xApp instance ID (this is from x-App instance 400 towards server 420).

In operation 14, a successful registration response message may be sent back to xApp instance from server 420 after the Near-RT platform identifies the xApp with xApp registration entries. The RIC may also inform SMO 440 about successful deployment of the xApp.

Figure 5:
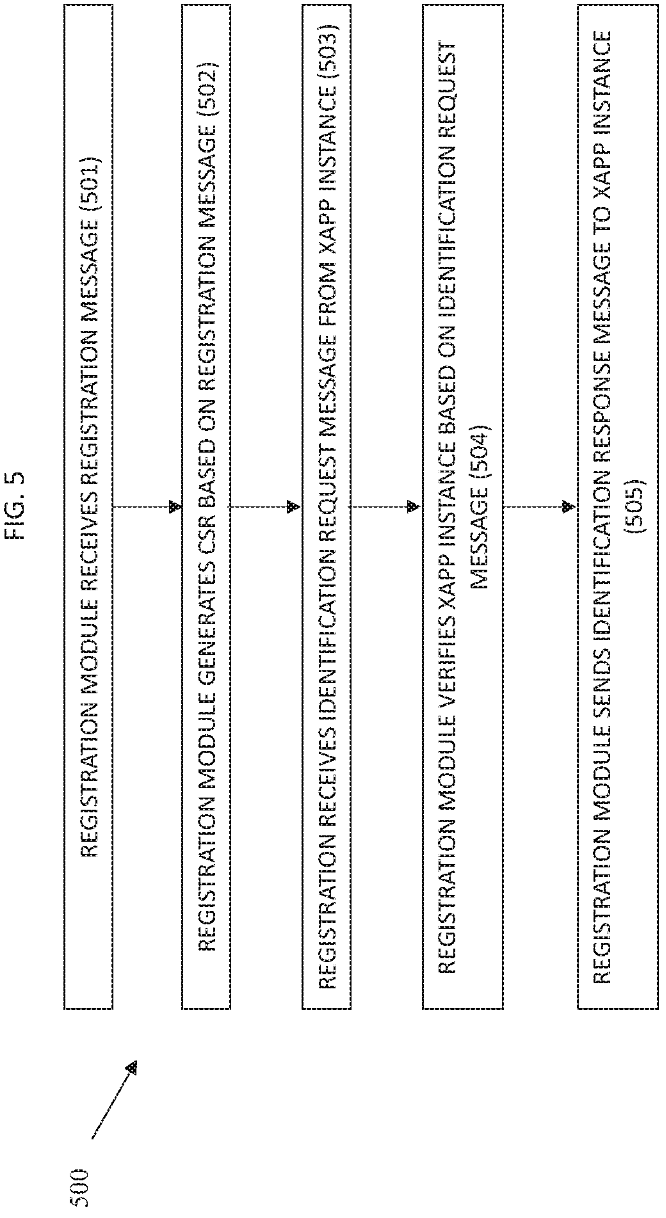
FIG. 5 illustrates an example flowchart of a method for handling xApp instance registration according to an embodiment.

FIG. 5 illustrates an example flowchart of a method 500 for handling xApp instance registration according to an embodiment, particularly from the perspective of registration module. Registration module may be similar to registration module 221, 320, or server 420 described with reference to FIG. 2, 3A-3B, or 4A-4C above.

At operation 501, a registration message that includes details of an xApp instance and an xApp ID may be received from SMO (e.g., SMO 210, 310, 440 described with reference to FIG. 2, 3A-3B, or 4A-4C above). This may be similar to operation 3 with reference to FIG. 3A, and operation 3 with reference to FIG. 4B above.

At operation 502, a CSR may be generated by the registration module. Upon generating the CSR, the registration module may forward the CSR to an operator CA for signing and thereafter receive a certificate which includes the xApp ID from the operator CA. This may be similar to operations 4-6 with reference to FIG. 3A, and operations 8-9 with reference to FIG. 4B above.

At operation 503, the registration module may receive an identification request message from the xApp instance. The identification request message may be sent from a helper module of the xApp instance (e.g., the sidecar 232 described with reference to FIG. 2 above) and the message may include a service account token and a pod ID for the xApp instance. This may be similar to operations 11-12 with reference to FIG. 3B, and operation 13 with reference to FIG. 4C above.

At operation 504, the registration module may verify the xApp instance based on the identification request message. This may be performed using TLS via a validation API. This may further include querying pod details and characteristics from the xApp instance using the service account token and pod ID in the identification request message received in operation 503 above. This may be similar to operations 13-16 with reference to FIG. 3B above.

At operation 505, the registration module may send an identification response message to the xApp instance. The response message may include a private key, a certificate with the xApp ID, and a trust bundle. The certificate may specifically be an X.509 certificate, and the xApp ID may be an SVID. This may be similar to operation 17 with reference to FIG. 3B, and operation 14 with reference to FIG. 4C above.

Figure 6:
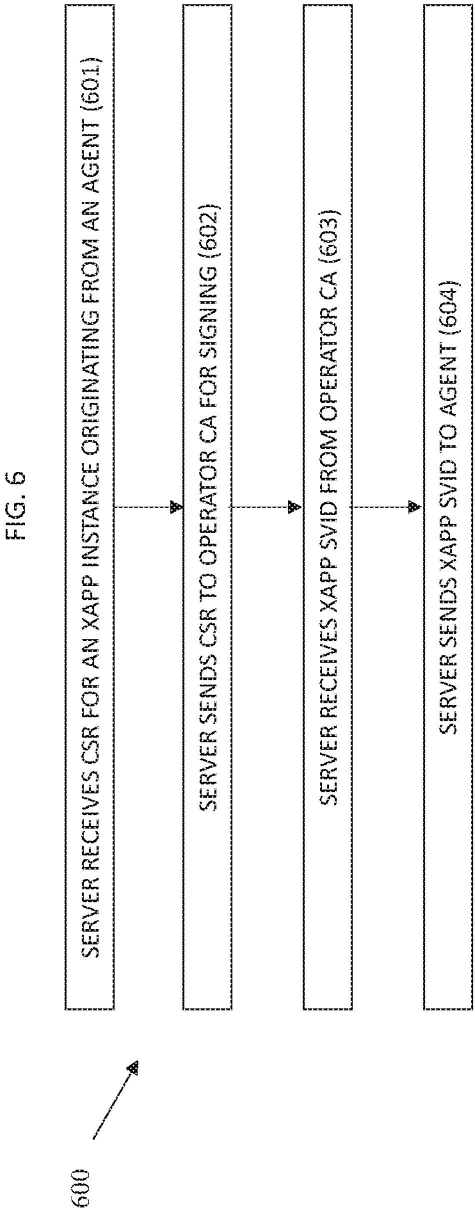
FIG. 6 illustrates an example flowchart of a method for handling xApp instance registration using a Near RT-RIC or server according to an embodiment.

FIG. 6 illustrates an example flowchart of a method 600 for handling xApp instance registration according to an embodiment, particularly from the perspective of Near RT-RIC or a server. This may particularly be similar to server 420 described with reference to FIG. 4A-4C above.

At operation 601, the server may receive a CSR from an xApp instance originating from an agent (e.g., Agent 410 with reference to FIG. 4A-4C above). The agent may be initialized on an xApp node. This may be similar to operation 7 with reference to FIG. 4B above.

At operation 602, the server may send the CSR received in operation 601 to an operator CA for signing (e.g., operator CA 430 with reference to FIG. 4A-4C above). This may be similar to operation 8 with reference to FIG. 4B above.

At operation 603, the server may receive an xApp SVID from the operator CA. This may be similar to operation 9 with reference to FIG. 4B above.

At operation 604, the server may send the xApp SVID received in operation 603 to the agent. This may be similar to operation 10 with reference to FIG. 4B above.

After receiving the xApp SVID in operation 604, according to some embodiments, the xApp instance may establish a secure session with the Near RT-RIC and receive a registration request message which includes the xApp ID, send a registration response message based on the registration request message after the Near RT-RIC identifies the xApp instance using xApp registration entries, and send a notification to SMO that the xApp instance was successfully deployed. These steps may correspond to operations 11-14 with reference to FIG. 4B-4C above.

Based on the above, it can be understood that since the registration module can handle the private key and certificate management for the xApp, the overall attack surface is reduced since the private key is not exposed. In addition, since the xApp instance itself does not generate the CSR, the xApp instances has reduced burden (e.g., private key and certificates are stored in the registration module's memory, and do not require external secure storage) and the xApp does not need to be aware of any underlying security management procedure(s). Accordingly, a more secure and efficient way of registering xApp instances may be achieved.

Figure 7:
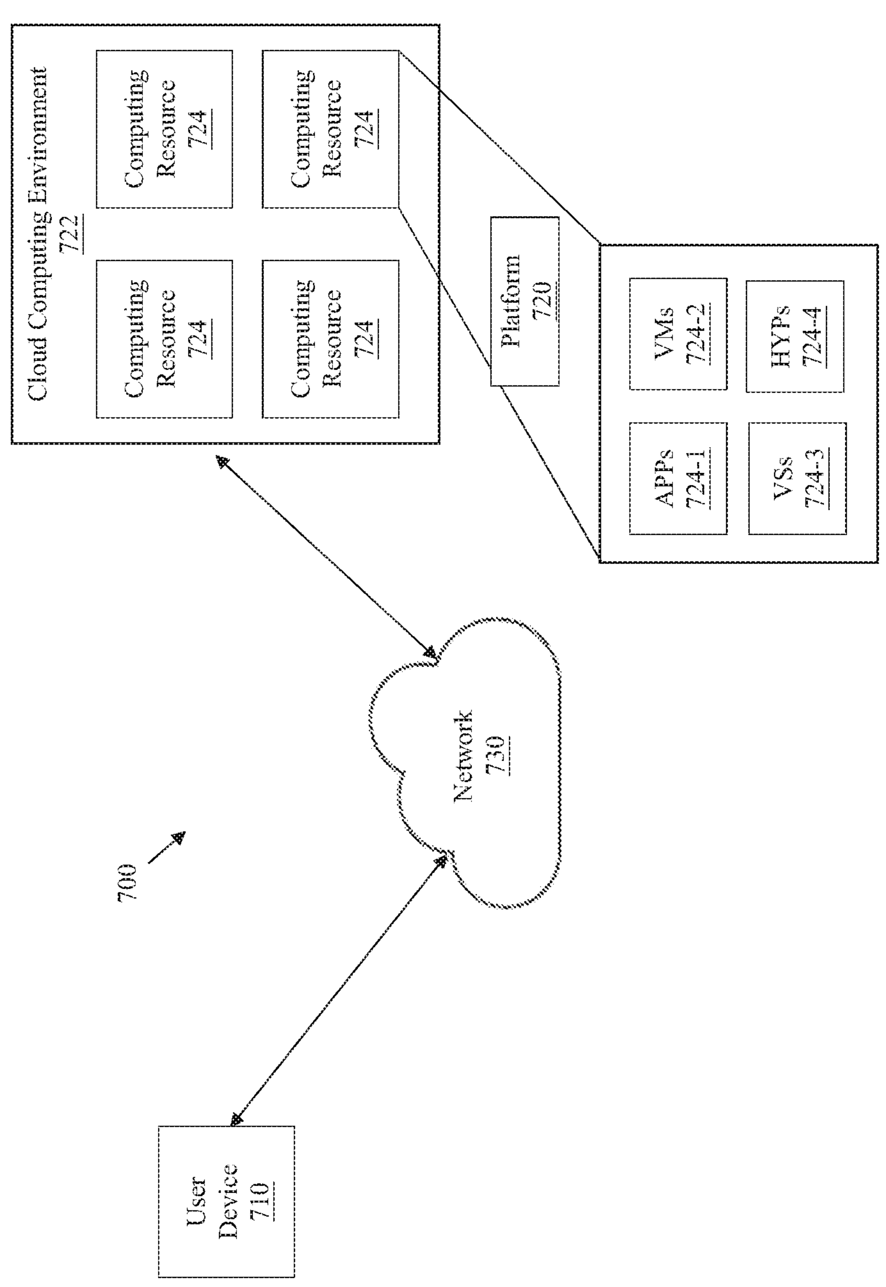
FIG. 7 illustrates a diagram of an example environment in which systems and/or methods, described herein, may be implemented.

FIG. 7 is a diagram of an example environment 700 in which systems and/or methods, described herein, may be implemented. As shown in FIG. 7, environment 700 may include a user device 710, a platform 720, and a network 730. Devices of environment 700 may interconnect via wired connections, wireless connections, or a combination of wired and wireless connections. In embodiments, any of the functions and operations described with reference to FIGS. 2 through 6 and 9 through 10 may be performed by any combination of elements illustrated in FIG. 7.

User device 710 includes one or more devices capable of receiving, generating, storing, processing, and/or providing information associated with platform 720. For example, user device 710 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 710 may receive information from and/or transmit information to platform 720.

Platform 720 includes one or more devices capable of receiving, generating, storing, processing, and/or providing information. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 may not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc., services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, a cluster of computing devices, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like. While the current example embodiment is with reference to virtualized network functions, it is understood that one or more other embodiments are not limited thereto, and may be implemented in at least one of containers, cloud-native services, one or more container platforms, etc. For example, in one or more other example embodiments, any of the above-described components (e.g., nodes, E2 nodes, SMO functions, RIC, system, apparatus, etc.) may be a software-based component deployed or hosted in, for example, a server cluster such as a hybrid cloud server, data center servers, and the like. The software-based component may be containerized and may be deployed and controlled by one or more machines, called "nodes", that run or execute the containerized network elements and are addressable. In this regard, a server cluster may contain at least one master node and a plurality of worker nodes, wherein the master node(s) controls and manages a set of associated worker nodes Application 724-1 includes one or more software applications that may be provided to or accessed by user device 710. Application 724-1 may eliminate a need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports execution of a complete operating system ("OS"). A process virtual machine may execute a single program, and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems, and may manage the execution of the guest operating systems. Multiple instances of a variety of operating systems may share virtualized hardware resources.

Network 730 includes one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
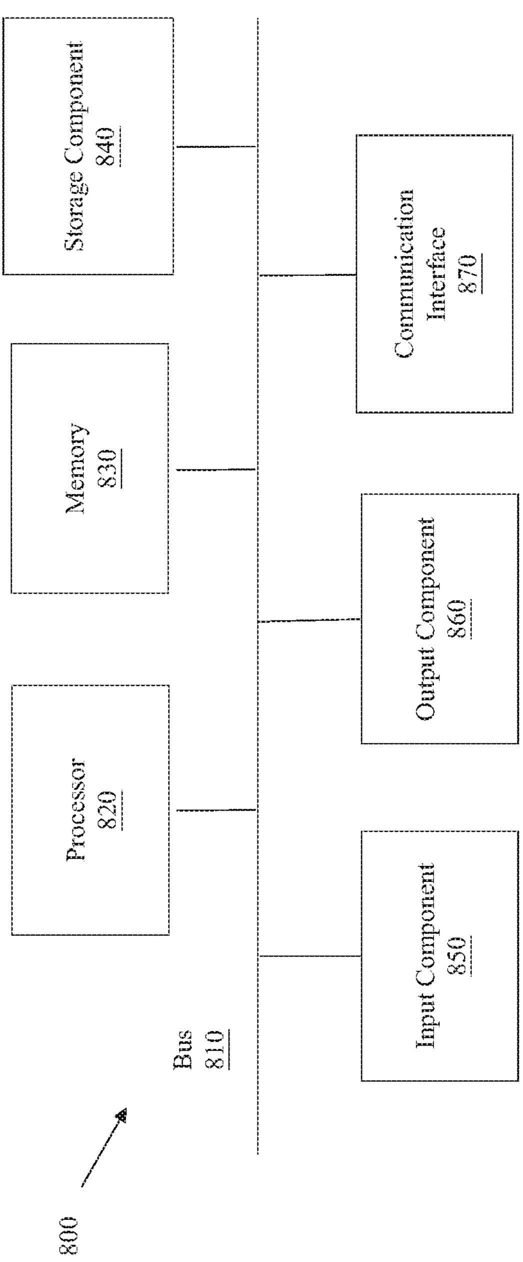
FIG. 8 illustrates a diagram of example components of a device according to an embodiment.

FIG. 8 is a diagram of example components of a device 800. Device 800 may correspond to user device 710 and/or platform 720. As shown in FIG. 8, device 800 may include a bus 810, a processor 820, a memory 830, a storage component 840, an input component 850, an output component 860, and a communication interface 870.

Bus 810 includes a component that permits communication among the components of device 800. Processor 820 may be implemented in hardware, firmware, or a combination of hardware and software. Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

Device 800 may perform one or more processes described herein. Device 800 may perform these processes in response to processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

In embodiments, any of the operations or processes of FIGS. 2-6 and 9-10 may be implemented by or using any one of the elements illustrated in FIGS. 7 and 8. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

These computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Further embodiments may be discussed herein below.

Standard Identity management of xApp during xApp Registration Procedure.

Introduction

The Near-RT RIC platform identifies and assigns a xApp ID to the xApp that is being deployed on its platform. However, there is no universally established identity for applications in a cloud native environment that can be interpreted programmatically and are more suitable to identify workloads in a cloud native environment.

The solution proposes to use SPIFFE—Secure Production Identity Framework which is a universal service identity control plane for distributed systems. This identity is designed for cloud-native and zero-trust based architectures.

This is also in adherence to NIST SP 800-207A which mentions that service identity should not be subjected to spoofing and should be continuously verifiable. An example of workload identity is a SPIFFE ID which is encoded as a Uniform Resource Identifier (URI) and carried in a cryptographically verifiable document called a SPIFFE Verifiable Identity Document (SVID).

SPIRE is a production-ready implementation of SPIFFE APIs that uses Node and workload attestation to securely issue SVID [X.509 certificate with SPIFFE ID] to Applications which can be used for service-service communication.

The main modules of the SPIFFE Specifications that are being used in the solution are:

1. SPIFFE ID: Standard URI format based on RFC 3986 with certain conditions. [EXAMPLE: spiffe://domain-name/clusterName/namespace/xAppName]
2. SVID (SPIFFE verifiable Identity document): Cryptographically verifiable document used to prove a service's identity to a peer. It Uses existing formats which are X509 certificates and JWT tokens.
3. Trust bundle: The CA certificate chain (root certificate and intermediate certificates) which entities use to verify the SVID.
4. SPIRE Agent and Server: SPIRE Agent deployed on the Node where xApp is deployed. SPIRE Server module is deployed in the Near-RT RIC Platform.
5. Optional Certificate side-car/[SPIFFE Helper] container along with xApp Instance Pod for handling key and certificate management.

As part of the xApp registration procedure into the Near-RT RIC platform, the xApp instance will use the SPIFFE ID for registering into the Near-RT RIC platform and will allow the platform to interpret the identity of the xApp instance via the structured SPIFFE ID format.

Figure 9:
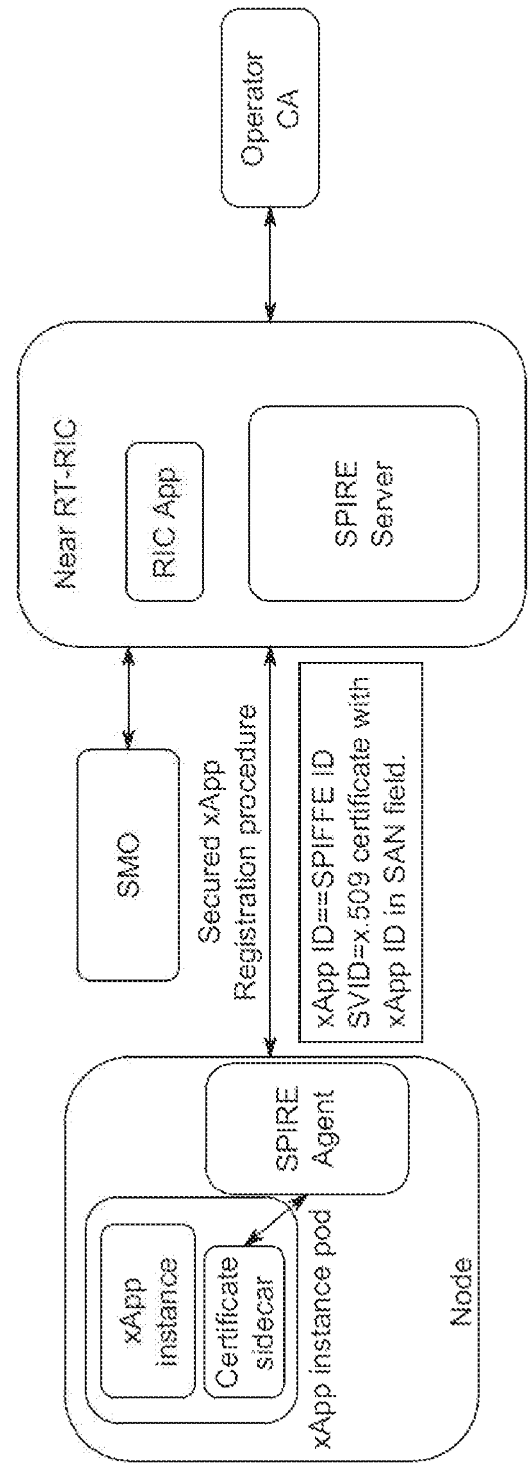
FIG. 9 illustrates an example system architecture diagram according to an embodiment.
Figure 10A:
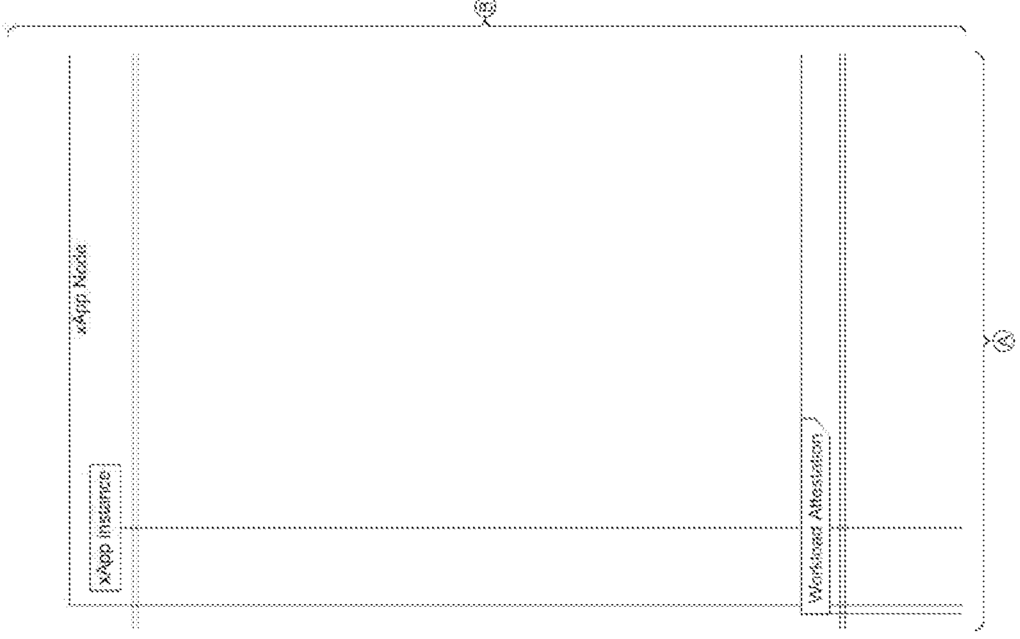
FIGS. 10A-10F illustrate an example for xApp registration procedure using SPIFFE framework according to an embodiment.
Figure 10B:
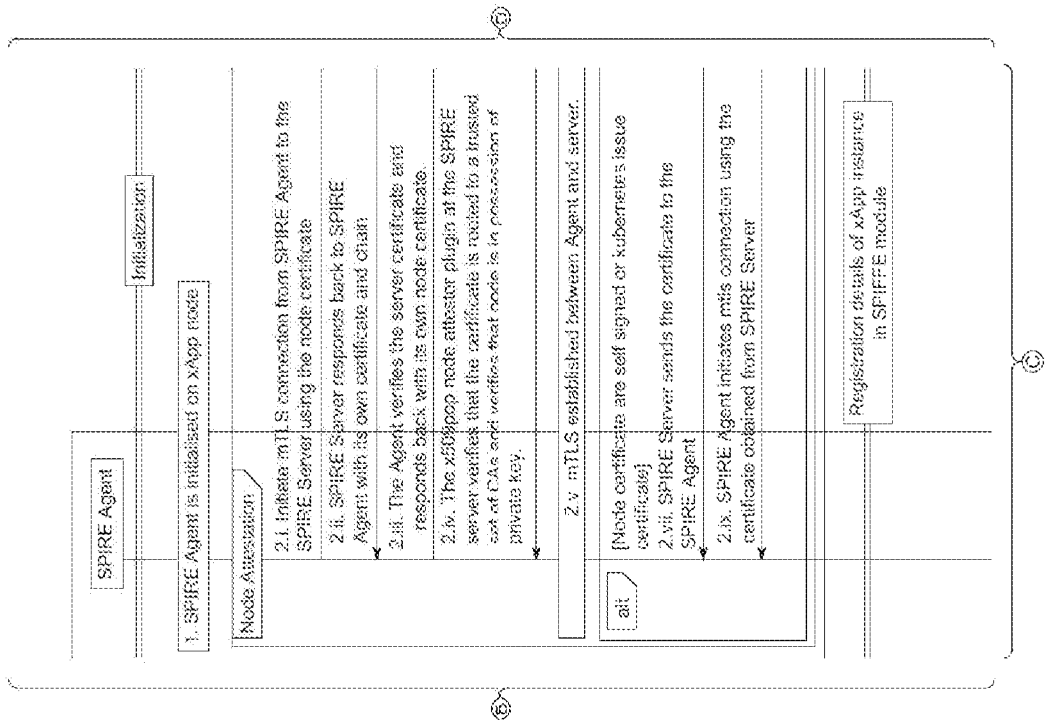
Figure 10C:
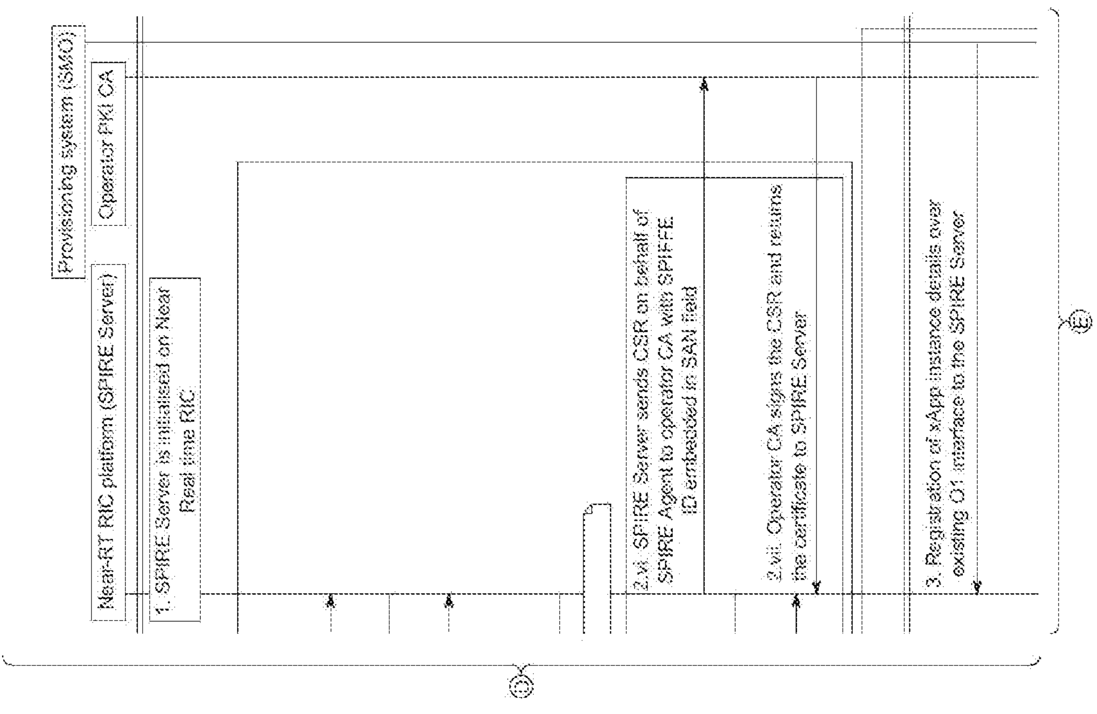
Figure 10D:
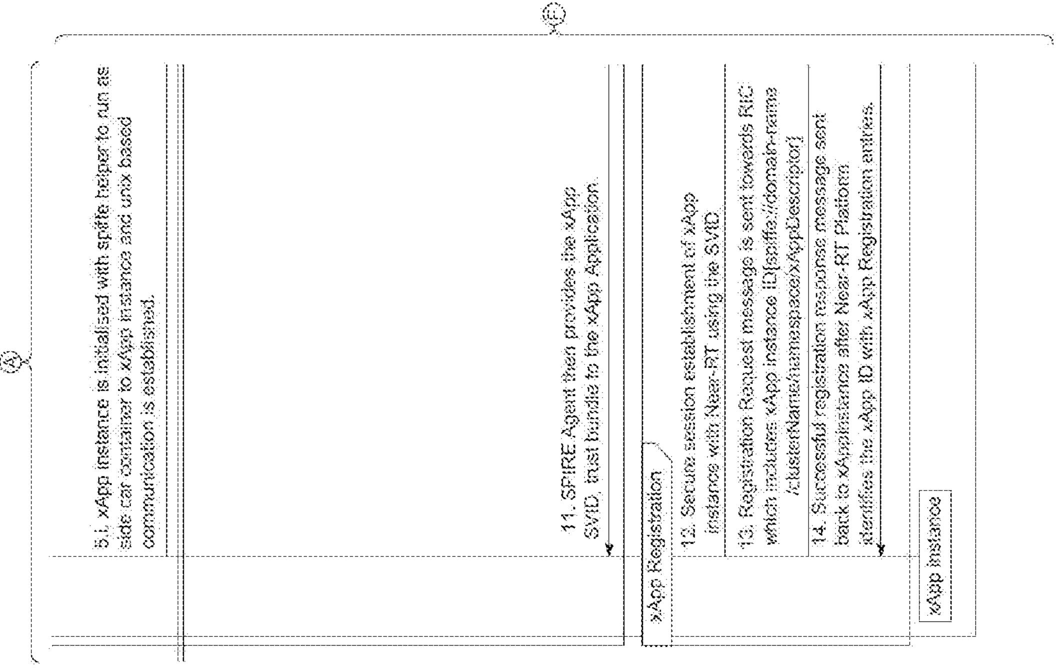
Figure 10E:
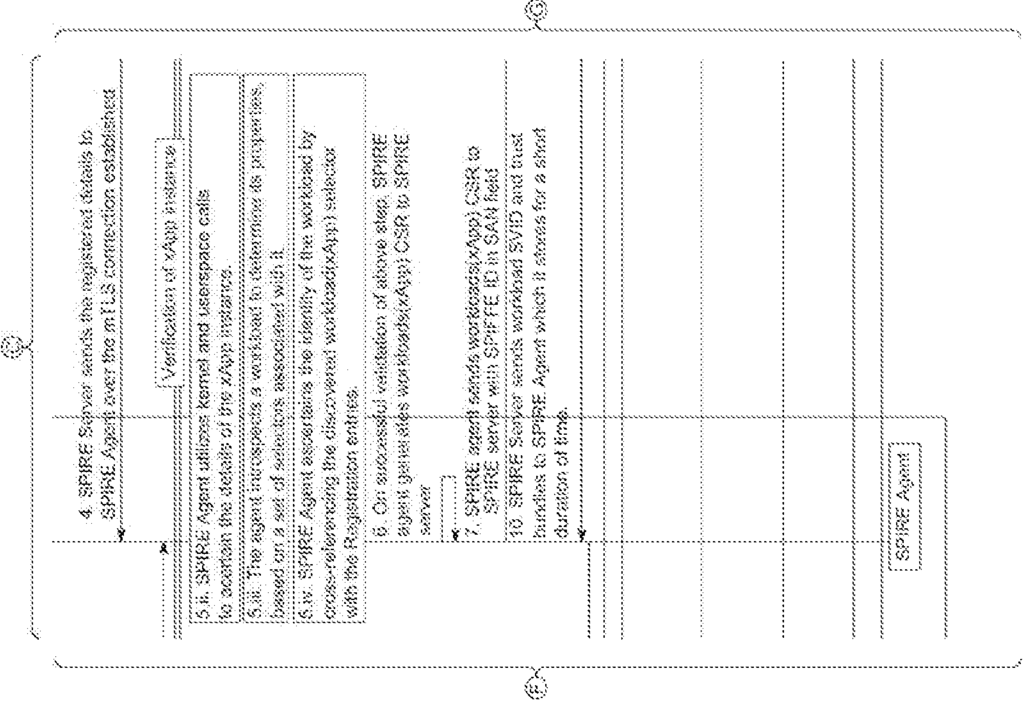
Figure 10F:
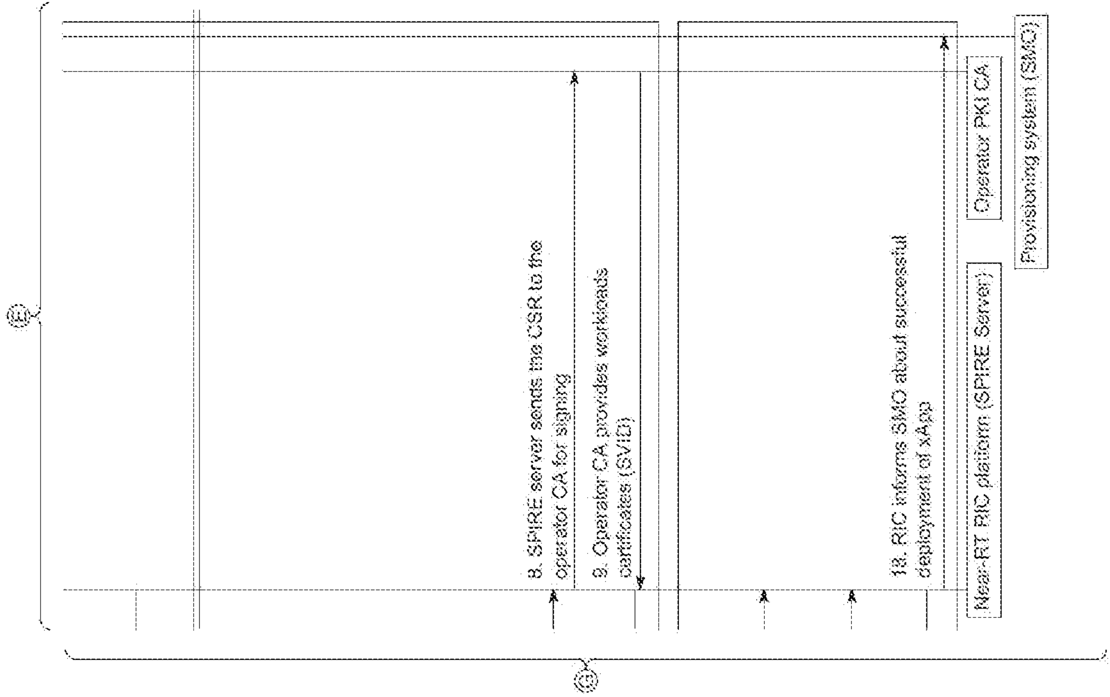

FIG. 9 illustrates an example of the system architecture used in the solution according to embodiments.

Solution Details

The steps outlining the solution are elaborated below.

Step 1: Define the Actors and Roles in the xApp Registration Procedure and the Pre-requisite.

xApp Instance Pod: xApp Application, (optional) Certificate Side Car originator for certificate and key management.

SPIRE agent: To oversee identity management and conduct workload verification within the system.

SPIRE Server in Near-RT RIC platform: handles the registration-related message from/to xApp.A central component responsible for managing identities and issuing identity credentials.

Pre-requisites: As a pre-requisite, the xApp Instance Node should have the information details of the Near-RT RIC platform IP address, Trust anchors) from the provisioning system.

Step 2: Node Attestation: SPIRE Agent and SPIRE Server Secured channel establishment.

2.i SPIRE Agent initiates the mTLS with the Server for its attestation. Spire Agent uses the Node certificates in this step which can be Kubernetes issued or Operator signed certificates. Step 2.ii to 2.iv details the procedures for Nodes Certificates signed by Operator CA.

2.ii SPIRE Server responds back to SPIRE Agent with its own certificate and chain.

2.iii The Agent verifies the server certificate and responds back with its own node certificate.

2.iv The x509pop node attestor plugin at the SPIRE server verifies that the certificate is rooted to a trusted set of CAs and verifies that node is in possession of private key. The TLS connection gets successfully established.

2.v In case of Kubernetes issued certificates the additional steps from 2.vi to 2.ix should be followed.

2.vi, SPIRE server shall generate a CSR on behalf of the SPIRE Agent and send to the Operator CA for signing.

2.vii The Operator CA signs the CSR and sends the SVID [X.509 certificate with SPIFFE ID in the SAN field] to the SPIRE Server.

2.viii The SPIRE Servers sends the TRUST Bundle to the SPIRE Agent over the existing mTLS connection.

2.ix The SPIRE Agent will re-establish the mTLS connection with the newly received SVID.

Step 3: Registration entries of Workload in SPIRE Server: As mentioned, the SMO maps the RIC variables and instructs the O-Cloud DMS to create the xApp Deployment and allocate the resources necessary on the Near-RT RIC. As a part of this procedure, the SMO would send the xApp Registration entries via its O1 interface to the Near-RT RIC. It would map a structured SPIFFE ID to each xApp Instance and facilitate the Near-RT RIC to identify the xApp being deployed and manage its life cycle.

Example: Registration Entries of Two xApp Instances

| Registration Entries | |
|---|---|
| SPIFFE ID | 1 Name = xAppDescriptor |
| spiffe://domain-name/clusterName/namespace/xAppName-1 | 2 xApp name-1, vendor, software version, containers, pod- label(label1), and any Operator customized Kubernetes deployment information. |
| spiffe://domain-name/clusterName/namespace/xAppName-2 | 3 xApp name-2, vendor, software version, containers,pod- label(label2), and any Operator customized Kubernetes deployment information. |

Step 4: Registration Entries in Agent for SVID Issuance: SPIRE Server sends the workload (xApp) Registration entry details to the SPIRE agents registered on it.

Step 5: Workload Attestation: Workload xApp Instance is instantiated. Also, an optional component of side-car container can be instantiated to handle the certificate and key management of xApp Instance which offloads the xApp Instance for security related functions.

5.i The xApp Instance Pod communicate with the SPIRE Agent over a unix domain socket-based communication.

5.ii The SPIRE agent utilizes a combination of kernel and user space calls to gather supplementary information about the workload. The agent interrogates the node's kernel to identify the process ID of the caller. It then invokes any configured workload attestor plugins, providing them with the process ID of the workload. This process involves identifying the workload's pod ID through its cgroup association and subsequently obtaining information about the pod.

5.iii The agent introspects a workload to determine its properties, based on a set of selectors associated with it.

5.iv SPIRE Agent ascertains the identity of the workload by cross-referencing the discovered workload selectors with the Registration entries.

Step 6. Generate CSR: On successful validation in step 5, the SPIRE Agent will generate the CSR and private key for each workload (xApp). The CSRs will have the SPIFFE ID in the SAN field. The SPIFFE agent derives the SPIFFE ID from the Registration entries in Step 4 which uniquely identifies each xApp instance.

Step 7. SPIRE Agent sends xApp CSRs to the SPIRE server.

Step 8. CSR Signing: SPIRE Server in turns sends the xApp CSRs to the Operator CA for signing.

Step 9. Operator PKI: The Operator CA provides xApp SVID to the SPIRE Server. SVID are X.509 certificates with SPIFFE ID in the SAN field.

Step 10. SPIRE Server sends xApp SVIDs [X.509 Certificates with SPIFFE ID] and trust bundles which it stores in memory for a short duration of time.

Step 11. Issuance of SVID: SPIRE Agent then provides the xApp SVID, trust bundle to the certificate sidecar. The xApp Instance will then use the SVIDs for further communication like xApp Registration towards Near real-time RIC platform.

NOTE: The xApp instance would establish a secure session with the Near-RT RIC as per the Pre-requisites mentioned in Step 1.

Step 12: The xApp Instance sends Registration Request toward the Near-RT RIC platform over a secured TLS connection. The xApp instance should be able to extract the xApp ID from the X.509 certificate and include the xApp ID in its Registration Message.

Step 13. The Near-RT RIC platform responds with xApp registration response message once the xApp ID matches the Registration entries.

Step 14. Optional: The Near-RT RIC informs SMO about the successful deployment of xApp.

The solution proposes that xApp ID use a structured ID format of SPIFFE ID which can be interpreted programmatically. The mechanism introduced does not rely on information from xApp to determine the xApp ID. Unix socket-based communication is used for process-to-process communication within the Node. Optional side-car container for key and certificate management reduces the attack surface on the Applications.

FIG. 10A-FIG. 10F illustrates an example for xApp registration procedure using SPIFFE framework according to embodiments.

Evaluation

The following proposal uses a cloud native solution for service identity management of applications in a cloud native environment. This is in adherence to NIST 800-207A [41].SPIRE is a production-ready implementation of SPIFFE APIs that uses Node and workload attestation to securely issue SVID [X.509 certificate with SPIFFE ID] to Applications which can be used for service-service communication. Using SPIRE Agent and Server in an O-RAN environment, standardized identities can be provided to Applications like xApp. The SVID issued to xApp can be used to establish a secure connection with the Near-RT RIC platform and the xApp ID can be derived from the SAN field of the X.509 certificate.

Various Aspects of Embodiments

Various further respective aspects and features of embodiments of the present disclosure may be defined by the following items:

Item [1] A method implemented by a Near Real-Time (RT) Radio Access Network (RAN) Intelligent Controller (RIC), the method including: receiving a registration message including details of an xApp instance and an xApp identifier (ID) from Service Management and Orchestration (SMO); generating a certificate signing request (CSR) based on the registration message, wherein the CSR includes the xApp ID registered in the Near RT-RIC; receiving an identification request message from the xApp instance; verifying the xApp instance based on the identification request message; and sending an identification response message to the xApp instance.

Item [2] The method according to item [1], further including: forwarding the CSR to an operator certificate authority (CA) for signing; and receiving a certificate with the xApp ID from the operator CA.

Item [3]: The method according to any one of items [1]-[2], wherein the verifying the xApp instance is performed using transport layer security (TLS) via a validation API.

Item [4]: The method according to any one of items [1]-[3], wherein the identification request message includes a service account token and a pod identifier (ID) for the xApp instance.

Item [5]: The method according to item [4], wherein verifying the xApp instance based on the identification request message further includes: querying pod details and characteristics from the xApp instance using the service account token and pod ID; comparing the pod details and characteristics of the xApp instance with registered information of the xApp instance.

Item [6]: The method according to any one of items [1]-[5], wherein the identification response message includes a private key, a certificate with the xApp ID, and a trust bundle.

Item [7]: The method according to item [6], wherein the certificate is an X.509 certificate, and the xApp ID is a Secure Production Identity Framework for Everyone (SPIFFE) verifiable identity document (SVID).

Item [8]: A method implemented by a Near Real-Time (RT) Radio Access Network (RAN) Intelligent Controller (RIC), the method including: receiving, by a server, a certificate signing request (CSR) for an xApp instance originating from an agent, wherein the CSR includes an xApp identifier (ID); sending, by the server, the CSR to an operator certificate authority (CA) for signing; receiving, by the server, an xApp Secure Production Identity Framework for Everyone (SPIFFE) verifiable identity document (SVID) from the operator CA; and sending, by the server, the xApp SVID to the agent, wherein upon receiving the xApp SVID, the agent provides the xApp SVID and a trust bundle to the xApp instance.

Item [9]: The method according to item [8], wherein the server is initialized on the Near RT-RIC, and the agent is initialized on an xApp node.

Item [10]: The method according to item [9], wherein the xApp instance establishes a secure session with the Near RT-RIC using the xApp SVID, the method further including: receiving, by the server, a registration request message including the xApp ID; sending, by the server, a registration response message based on the registration request message after the Near RT-RIC identifies the xApp instance using xApp registration entries; and sending, by the server, a notification to Service Management and Orchestration (SMO) that the xApp instance was successfully deployed.

Item [11]: A Near Real-Time (RT) Radio Access Network (RAN) Intelligent Controller (RIC) configured to: receive a registration message including details of an xApp instance and an xApp identifier (ID) from Service Management and Orchestration (SMO); generate a certificate signing request (CSR) based on the registration message, wherein the CSR includes the xApp ID registered in the Near RT-RIC; receive an identification request message from the xApp instance; verify the xApp instance based on the identification request message; and send an identification response message to the xApp instance.

Item [12]: The Near RT-RIC according to item [11], wherein the Near RT-RIC is further configured to: forward the CSR to an operator certificate authority (CA) for signing; and receive a certificate with the xApp ID from the operator CA.

Item [13]: The Near RT-RIC according to any one of items [11]-[12], wherein the verifying the xApp instance is performed using transport layer security (TLS) via a validation API.

Item [14]: The Near RT-RIC according to any one of items [11]-[13], wherein the identification request message includes a service account token and a pod identifier (ID) for the xApp instance.

Item [15]: The Near RT-RIC according to item [14], wherein the Near RT-RIC is further configured to verify the xApp instance based on the identification request message by: querying pod details and characteristics from the xApp instance using the service account token and pod ID; and comparing the pod details and characteristics of the xApp instance with registered information of the xApp instance.

Item [16]: The Near RT-RIC according to any one of items [11]-[15], wherein the identification response message includes a private key, a certificate with the xApp ID, and a trust bundle.

Item [17]: The Near RT-RIC according to item [16], wherein the certificate is an X.509 certificate, and the xApp ID is a Secure Production Identity Framework for Everyone (SPIFFE) verifiable identity document (SVID).

Item [18]A Near Real-Time (RT) Radio Access Network (RAN) Intelligent Controller (RIC) configured to: receive a certificate signing request (CSR) for an xApp instance originating from an agent, wherein the CSR includes an xApp identifier (ID); send the CSR to an operator certificate authority (CA) for signing; receive an xApp Secure Production Identity Framework for Everyone (SPIFFE) verifiable identity document (SVID) from the operator CA; and send the xApp SVID to the agent, wherein upon receiving the xApp SVID, the agent provides the xApp SVID and a trust bundle to the xApp instance.

Item [19] The Near RT-RIC according to item [18], wherein a server is initialized on the Near RT-RIC, and the agent is initialized on an xApp node.

Item [20] The Near RT-RIC according to item [19], wherein the xApp instance establishes a secure session with the Near-RT RIC using the xApp SVID, and wherein the Near-RT RIC is further configured to: receive a registration request message including the xApp ID; send a registration response message based on the registration request message after the Near RT-RIC identifies the xApp instance using xApp registration entries; and send a notification to Service Management and Orchestration (SMO) that the xApp instance was successfully deployed.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A method implemented by a Near Real-Time (RT) Radio Access Network (RAN) Intelligent Controller (RIC), the method comprising:

receiving a registration message including details of an xApp instance and an xApp identifier (ID) from Service Management and Orchestration (SMO);

generating a certificate signing request (CSR) based on the registration message, wherein the CSR includes the xApp ID registered in the Near RT-RIC;

receiving an identification request message from the xApp instance, which is distinct and external to the SMO;

verifying the xApp instance based on the identification request message; and sending an identification response message to the xApp instance.

2. The method of claim 1, further comprising:

forwarding the CSR to an operator certificate authority (CA) for signing; and receiving a certificate with the xApp ID from the operator CA.

3. The method of claim 1, wherein the verifying the xApp instance is performed using transport layer security (TLS) via a validation API.

4. The method of claim 1, wherein the identification request message includes a service account token and a pod identifier (ID) for the xApp instance.

5. The method of claim 4, wherein the verifying the xApp instance based on the identification request message comprises:

querying pod details and characteristics from the xApp instance using the service account token and the pod ID;

comparing the pod details and the characteristics of the xApp instance with registered information of the xApp instance.

6. The method of claim 1, wherein the identification response message includes a private key, a certificate with the xApp ID, and a trust bundle.

7. The method of claim 6, wherein the certificate is an X.509 certificate, and the xApp ID is a Secure Production Identity Framework for Everyone (SPIFFE) verifiable identity document (SVID).

8. A method implemented by a Near Real-Time (RT) Radio Access Network (RAN) Intelligent Controller (RIC), the method comprising:

receiving a registration request message including details of an xApp instance from Service Management and Orchestration (SMO), the xApp instance being distinct and external to the SMO;

receiving, by a server, a certificate signing request (CSR) for the xApp instance originating from an agent, wherein the CSR includes an xApp identifier (ID);

sending, by the server, the CSR to an operator certificate authority (CA) for signing;

receiving, by the server, an xApp Secure Production Identity Framework for Everyone (SPIFFE) verifiable identity document (SVID) from the operator CA; and sending, by the server, the xApp SVID to the agent, wherein upon receiving the xApp SVID, the agent provides the xApp SVID and a trust bundle to the xApp instance.

9. The method of claim 8, wherein the server is initialized on the Near RT-RIC, and the agent is initialized on an xApp node.

10. The method of claim 9, wherein the xApp instance establishes a secure session with the Near RT-RIC using the xApp SVID, and wherein the registration request message includes the xApp ID, the method further comprising:

sending, by the server, a registration response message based on the registration request message after the Near RT-RIC identifies the xApp instance using xApp registration entries; and sending, by the server, a notification to Service Management and Orchestration (SMO) that the xApp instance was successfully deployed.

11. A system comprising:

a Near Real-Time (RT) Radio Access Network (RAN) Intelligent Controller (RIC) configured to:

receive a registration message including details of an xApp instance and an xApp identifier (ID) from Service Management and Orchestration (SMO);

generate a certificate signing request (CSR) based on the registration message, wherein the CSR includes the xApp ID registered in the Near RT-RIC;

receive an identification request message from the xApp instance, which is distinct and external to the SMO;

verify the xApp instance based on the identification request message; and send an identification response message to the xApp instance.

12. The system of claim 11, further configured to:

forward the CSR to an operator certificate authority (CA) for signing; and receive a certificate with the xApp ID from the operator CA.

13. The system of claim 11, wherein the verifying the xApp instance is performed using transport layer security (TLS) via a validation API.

14. The system of claim 11, wherein the identification request message includes a service account token and a pod identifier (ID) for the xApp instance.

15. The system of claim 14, wherein the Near RT-RIC is further configured to verify the xApp instance based on the identification request message by:

querying pod details and characteristics from the xApp instance using the service account token and the pod ID; and comparing the pod details and the characteristics of the xApp instance with registered information of the xApp instance.

16. The system of claim 11, wherein the identification response message includes a private key, a certificate with the xApp ID, and a trust bundle.

17. The system of claim 16, wherein the certificate is an X.509 certificate, and the xApp ID is a Secure Production Identity Framework for Everyone (SPIFFE) verifiable identity document (SVID).

18. A system comprising:

a Near Real-Time (RT) Radio Access Network (RAN) Intelligent Controller (RIC) configured to:

receive a registration request message including details of an xApp instance from Service Management and Orchestration (SMO), the xApp instance being distinct and external to the SMO;

receive a certificate signing request (CSR) for the xApp instance originating from an agent, wherein the CSR includes an xApp identifier (ID);

send the CSR to an operator certificate authority (CA) for signing;

receive an xApp Secure Production Identity Framework for Everyone (SPIFFE) verifiable identity document (SVID) from the operator CA; and send the xApp SVID to the agent, wherein upon receiving the xApp SVID, the agent provides the xApp SVID and a trust bundle to the xApp instance.

19. The system of claim 18, wherein a server is initialized on the Near RT-RIC, and the agent is initialized on an xApp node.

20. The system of claim 19, wherein the xApp instance establishes a secure session with the Near-RT RIC using the xApp SVID, wherein the registration request message includes the xApp ID, and wherein the Near-RT RIC is further configured to:

send a registration response message based on the registration request message after the Near RT-RIC identifies the xApp instance using xApp registration entries; and send a notification to Service Management and Orchestration (SMO) that the xApp instance was successfully deployed.

* * * * *